United States Patent
van Nee et al.

(10) Patent No.: US 8,483,328 B2
(45) Date of Patent: Jul. 9, 2013

(54) SYSTEM FOR SOFT SYMBOL DECODING MIMO LOG-MAP DETECTION

(75) Inventors: Didier Johannes Richard van Nee, De Meern (NL); Vincent Knowles Jones, IV, Redwood City, CA (US); Geert Arnout Awater, Utrecht (NL); James Gardner, San Ramon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 12/629,282

(22) Filed: Dec. 2, 2009

(65) Prior Publication Data
US 2010/0111234 A1    May 6, 2010

Related U.S. Application Data

(63) Continuation of application No. 11/965,511, filed on Dec. 27, 2007, now Pat. No. 7,649,966, which is a continuation of application No. 10/376,060, filed on Feb. 26, 2003, now Pat. No. 7,315,576, which is a continuation of application No. 10/068,571, filed on Feb. 5, 2002, now abandoned.

(51) Int. Cl.
*H04L 27/06* (2006.01)
(52) U.S. Cl.
USPC .......... 375/341; 375/259; 375/262; 375/265; 375/267; 375/299; 375/347; 714/794; 714/795; 714/796
(58) Field of Classification Search
USPC .............. 375/260–262, 267, 316, 340–341, 375/324, 347; 714/794–797
See application file for complete search history.

(56) References Cited

U.S. PATENT DOCUMENTS

| | | | | |
|---|---|---|---|---|
| 4,933,956 A * | 6/1990 | Forney, Jr. | ..................... | 375/341 |
| 5,862,190 A * | 1/1999 | Schaffner | ..................... | 375/341 |
| 5,867,538 A * | 2/1999 | Liu | ..................... | 375/341 |
| 5,901,182 A * | 5/1999 | Kot | ..................... | 375/341 |
| 6,009,552 A | 12/1999 | Ariel et al. | | |
| 6,144,711 A | 11/2000 | Raleigh et al. | | |
| 6,158,041 A * | 12/2000 | Raleigh et al. | ................. | 714/792 |
| 6,161,209 A * | 12/2000 | Moher | .......................... | 714/780 |
| 6,192,238 B1 | 2/2001 | Piirainen | | |
| 6,594,318 B1 | 7/2003 | Sindhushayana | | |
| 6,662,331 B1 | 12/2003 | Kang | | |
| 6,760,390 B1 | 7/2004 | Desai et al. | | |
| 6,789,225 B2 * | 9/2004 | Dorney et al. | ................. | 714/752 |
| 6,829,313 B1 * | 12/2004 | Xu | ..................... | 375/341 |
| 6,876,709 B1 * | 4/2005 | Kim et al. | ..................... | 375/341 |
| 6,891,897 B1 | 5/2005 | Bevan et al. | | |
| 6,980,602 B1 | 12/2005 | Kleinerman et al. | | |
| 7,068,628 B2 | 6/2006 | Li et al. | | |
| 7,076,000 B2 * | 7/2006 | Rodriguez | ..................... | 375/262 |
| 7,245,666 B1 | 7/2007 | Gardner et al. | | |
| 7,310,369 B1 | 12/2007 | Krieger et al. | | |
| 7,315,576 B1 | 1/2008 | Van Nee et al. | | |
| 7,421,035 B1 | 9/2008 | Gardner et al. | | |
| 7,434,145 B2 | 10/2008 | Jin et al. | | |
| 7,450,631 B2 | 11/2008 | Pick et al. | | |
| 7,649,966 B2 | 1/2010 | Van Nee et al. | | |
| 2001/0004391 A1 * | 6/2001 | Naitou | ..................... | 375/341 |
| 2002/0051498 A1 * | 5/2002 | Thomas et al. | ................. | 375/262 |
| 2002/0159535 A1 | 10/2002 | Agami et al. | | |
| 2003/0051206 A1 * | 3/2003 | Kondo | ..................... | 714/795 |
| 2003/0053535 A1 | 3/2003 | Malkov et al. | | |
| 2003/0076890 A1 | 4/2003 | Hochwald et al. | | |
| 2003/0123381 A1 * | 7/2003 | Zhuang et al. | ................. | 370/208 |
| 2004/0066866 A1 | 4/2004 | Tong et al. | | |
| 2004/0170233 A1 | 9/2004 | Onggosanusi et al. | | |
| 2005/0111592 A1 | 5/2005 | Yee | | |
| 2005/0175122 A1 | 8/2005 | Nefedov et al. | | |
| 2005/0265465 A1 | 12/2005 | Hosur et al. | | |
| 2006/0018410 A1 | 1/2006 | Onggosanusi et al. | | |
| 2006/0045169 A1 | 3/2006 | Kim | | |
| 2006/0085497 A1 | 4/2006 | Sehitoglu | | |
| 2006/0115026 A1 | 6/2006 | MacLeod | | |
| 2006/0148506 A1 | 7/2006 | Hoo | | |
| 2006/0280116 A1 | 12/2006 | Ji et al. | | |
| 2008/0130796 A1 | 6/2008 | Rouxel et al. | | |

OTHER PUBLICATIONS

Zhu et al., Multi-input Multi-output Maximum Likelihood Detection for a Wireless System, 2001, Vehicular Technology Conference, 2001. VTC 2001 Spring. IEEE VTS 53rd, vol. 1, pp. 137-141.*

Interim Guidelines for Examination of Patent Applications for Patent Subject Matter Eligibility, pp. 50-54, 58-59.
Final Office Action mailed Jun. 25, 2009 for U.S. Appl. No. 11/965,511, 27 pages.
Office Action mailed Dec. 17, 2008 for U.S. Appl. No. 11/965,511, 47 pages.

\* cited by examiner

*Primary Examiner* — Daniel Washburn
*Assistant Examiner* — Eboni Hughes
(74) *Attorney, Agent, or Firm* — Howard Seo

(57) ABSTRACT

A soft symbol decoder for use in a multiple input multiple output (MIMO) and OFDM (orthogonal frequency division multiplexing) system. The decoder generates soft symbol values for a digital signal that represents a number of source bits. The source bits are transmitted as symbols in corresponding to points in a signaling constellation. Soft metrics are determined by searching for all possible multi-dimensional symbols that could have been transmitted. The method includes transmitting a sample of the multi-dimensional symbol using K transmit antennas. The multi-dimensional symbol is represent-able as a complex, K-dimensional vector x. Each vector component of vector x represents a signal transmitted with one of the K transmit antennas. After transmission through a communication channel, a sample corresponding to the transmitted sample is received. The received sample is represented by a complex, N-dimensional vector y, where N is the number of receive antennas in the MIMO system. After the sample is received, a soft metric $L(b_i)$ is determined for each bit $b_i$ encoded by x according to the equation:

$$L(b_i) = \sigma^{-2} \cdot \left( \min_{x_j | b_i = -1} \|y - Hx_j\|^2 - \min_{x_j | b_i = +1} \|y - Hx_j\|^2 \right),$$

and $x_j$ represents all possible values for x. In addition, a reduced complexity method is used for providing soft metric values in the MIMO system. This exemplary aspect reduces the complexity of the above computations from $2^{BK}$ to $2^{B(K-1)}$, where B is the number of bits transmitted per symbol per antenna.

11 Claims, 2 Drawing Sheets

SYSTEM FOR SOFT SYMBOL DECODING MIMO LOG-MAP DETECTION

CROSS-REFERENCE

This application is a continuation of U.S. patent application Ser. No. 11/965,511, now U.S. Pat. No. 7,649,966, filed Dec. 27, 2007, entitled "SYSTEM FOR SOFT SYMBOL DECODING MIMO LOG-MAP DETECTION", which is a continuation application of U.S. patent application Ser. No. 10/376,060, now U.S. Pat. No. 7,315,576, filed Feb. 26, 2003, entitled "SYSTEM FOR SOFT SYMBOL DECODING MIMO LOG-MAP DETECTION", which is a continuation of U.S. patent application Ser. No. 10/068,571, filed Feb. 5, 2002, entitled "SYSTEM FOR SOFT SYMBOL DECODING MIMO LOG-MAP DETECTION, now abandoned. The entireties of these applications are hereby incorporated by reference.

BACKGROUND OF THE INVENTION

The present invention relates generally to the field of communication systems and more specifically to systems for soft decoding data symbols in multiple input multiple output communication systems.

Decoding is used by receivers to correctly identify transmitted data symbols. During data transmission, noise from many sources may corrupt transmitted signals so that what is received is not necessarily what was transmitted. For example, a signal transmitted as a 1 may be corrupted by noise and thereafter misinterpreted as a 0 at the receiver. Accurate information transmission depends upon being able to reliably detect transmitted 1s as 1s and 0s as 0s.

One technique for transmitting data symbols is known as M-ary signaling. In M-ary signaling, the transmitter repeatedly selects one of M possible unique symbols to send to represent the data being sent. In many systems, $M=2^k$ for some integer k and thus each symbol represents k bits. BPSK (binary phase shift keying) is an example of transmitting with $M=2$; the symbols can be represented as 0 and 1. QPSK (quadrature phase shift keying) provides for four symbols where each symbol codes for two bits (representable as 00, 01, 10 and 11).

In more complex keying schemes (e.g. QPSK), the signal amplitude varies as well as the phase. A signaling constellation is a mapping of symbols to particular (amplitude, phase) pairs. For single transmit and receive antennas, the signaling constellation has constellation points corresponding to the total number of symbols available. For instance, in QPSK, each symbol 00, 01, 10 and 11 is uniquely identifiable by a constellation point in the signaling constellation. The problem of signal fading manifests itself as distortions of signaling constellations where some of the points move closer together. For example, point 00 may be misinterpreted as point 01. This causes errors at the receiver during the detection process, where a constellation point is misinterpreted as a different constellation point.

To facilitate correct interpretation of constellation points, soft decision decoders are employed at receivers for providing soft decisions. A "soft decision" is neither a 0 nor a 1 but a number in between that provides a degree of confidence as to whether the signal is a 0 or a 1. After soft decisions are made, the numbers are passed on to an apparatus or process that determines, from the context, whether the signals are 0 or 1. One such process is the well-known Viterbi algorithm.

A system where one transmitter is used to transmit the data to one receiver is referred to as a SISO (single input single output) system, whereas a system where more than one transmitter is used and more than one receiver is used is referred to as a MIMO (multiple input multiple output) system. MIMO systems have advantages, such as being able to overcome the information capacity of SISO systems, increasing data rate, and obtaining increased receiver sensitivity. However, SISO systems have an advantage of simpler constellations. Conventional soft symbol decoding techniques used for SISO systems are inapplicable to MIMO systems which have more complex constellations.

What is needed is a soft symbol decoding system that can reliably perform soft symbol decoding for MIMO systems.

BRIEF SUMMARY OF THE INVENTION

A method for providing soft metrics in a MIMO communication system is disclosed. The method provides soft metrics by searching for all possible multi-dimensional symbols that could have been transmitted. As noted, such symbols are transmitted by K transmit antennas and received by N receive antennas, where K and N may be 2, 3, 4 . . . etc. Each component of the multi-dimensional symbol is transmitted with one of the K transmit antennas. The challenge is to ascertain that components received by the N receive antennas are what was transmitted by the K transmit antennas.

To accomplish this, soft metrics are provided to indicate likelihoods that a particular multi-dimensional symbol was transmitted. Specifically, a likelihood value is generated for each bit of the multi-dimensional symbol. Once generated, these metrics are forwarded to a decoder (e.g. a Viterbi decoder) for making hard decisions for the received symbols.

According to a first aspect of the present invention, the method includes the step of transmitting a sample of the multi-dimensional symbol using K transmit antennas. It should be noted that the multi-dimensional symbol is represent-able as a complex, K-dimensional vector x. Each component of vector x represents a signal transmitted with one of the K transmit antennas. After traveling through a communication channel, the sample is received by the receiver. The received sample is represented by a complex, N-dimensional vector y, where N is the number of receive antennas in the MIMO communication system.

In one aspect, the vector y is related to vector x according to an equation: y=Hx+n, where H is an N×K channel matrix modeling phase shifts and amplitude changes on paths between the K transmit and N receive antennas, and n is a complex N-dimensional vector representing communication channel noise. After the sample is received, the method further includes the step of determining a soft metric $L(b_i)$ for each bit $b_i$ encoded by x according to the equation:

$$L(b_i) = \sigma^{-2} \cdot \left( \min_{x_j | b_i = -1} \|y - Hx_j\|^2 - \min_{x_j | b_i = +1} \|y - Hx_j\|^2 \right),$$

where $x_j$ represents all possible values for x, and σ is a standard deviation of the noise and/or interference in the received signal, assumed equal across antennas. σ can be estimated or some fixed value can be used if it is expected that all symbols have the same signal-to-noise ratio. It should be observed that the complexity of this technique of soft value computation is $2^{BK}$ where B is the number of bits transmitted per symbol on each antenna. For example, where K=2 and each symbol is modulated using 16-QAM, for example, then the multi-dimensional symbol has $16^2=256$ possible values. When soft metrics are determined, they are passed to a Viterbi decoder that renders requisite hard decisions for the symbol bits.

According to another aspect of this invention, a reduced complexity method for providing soft metric values in the MIMO communication system is taught. This method reduces the complexity of the above computations from $2^{BK}$ to $2^{B(K-1)}$. For example, if K=2, and 64 QAM is employed for the MIMO system, a 64-fold reduction in complexity is obtained. In particular, for small values of K e.g. 2 or 3, the reduction in complexity is considerable.

Among other steps, the method includes providing a soft metric $L(b_i)$ for each bit $b_i$ encoded by a complex vector x. For illustrative purposes only, it is assumed that complex vector x contains no more than two elements namely a first element and a second element. This is the case where two transmit antennas (K=2) are employed within the system. However, one of ordinary skill in the art will realize that the complex vector x may contain two or more vector components as proves necessary in the present invention.

Next, this reduced complexity method includes the step of receiving a sample represented by a complex vector y. Thereafter, a vector estimate of vector x is obtained by using the received vector y. In one aspect, this estimate is a scalar number obtained by factoring in amplitude and phase shifts in the communication channel. After the vector estimate of vector x is determined, its elements i.e., the first and second elements are obtained. For the first element, a hard decision is made on values for each of its bits. Using these values, a soft metric $L(b_i)$ for each bit $b_i$ encoded by the second element is determined. Similarly, for the second element, a hard decision is made on values for each of its bits. Using these values, a soft metric $L(b_i)$ is determined for each bit $b_i$ encoded by the first element. These soft metrics are then forwarded to a Viterbi decoder where hard decisions are made.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

The following notation is used for number representation in the Specification: (1) lower case italic represents scalar quantities; (2) lower case bold represents vectors, and (3) upper case bold is used for matrices.

Briefly, one aspect of the present invention provides for a soft symbol decoder in a multiple input multiple output (MIMO) communication system. The decoder receives signals and generates corresponding soft symbol values. Soft symbols are used for indicating the likelihood that each bit of a symbol has a 0 or 1 state. That is, the probability that the transmitted bit is 0 or 1.

Transmitted signals are represented as multi-dimensional symbols or vectors in a signaling constellation. Multi-dimensional symbols may be sequential groupings of one-dimensional symbols. An example of such one-dimensional symbols is a QAM constellation. Although each symbol has in-phase and quadrature components, it is nevertheless considered a complex one-dimensional symbol. Multidimensional vectors may contain sequential groupings of such QAM constellation members. Each signal representing a vector element is accurately detected by using maximum a posteriori probability as further described herein.

Figure 1:
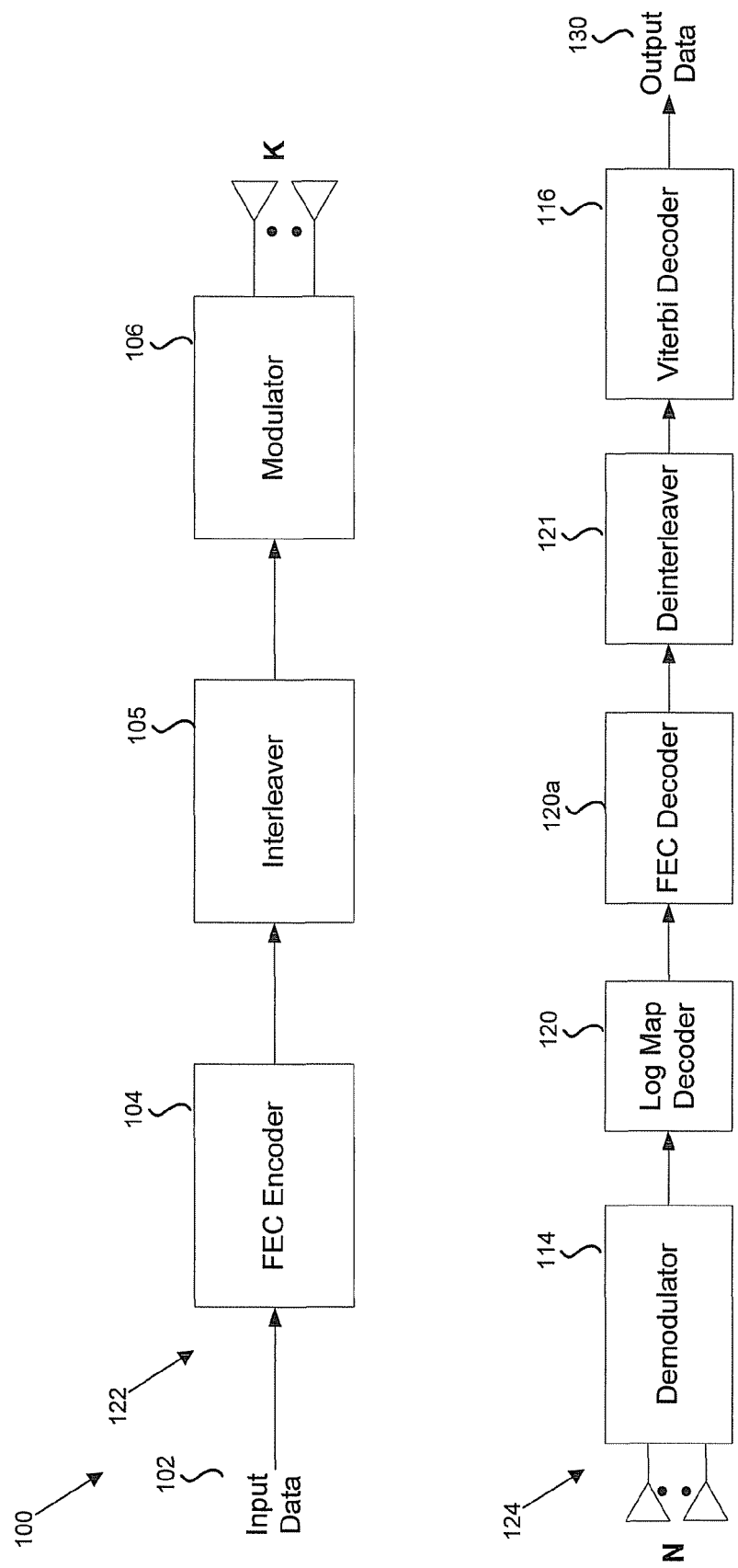
FIG. 1 is a MIMO communication system in which soft symbol decoding is implemented in accordance with a first embodiment of the present invention.

FIG. 1 is a block diagram of a communication system 100 in which soft symbol decoding is used in accordance with a first embodiment of this invention.

Among other components, communication system 100 includes a transmitter system 122 and a receiver system 124. Transmitter system 124 comprises a forward error correction (FEC) encoder 104 for encoding an input data stream using a suitable FEC code, and an interleaver 105 for grouping the input data for mapping. Transmitter system 124 also includes modulator 106 for modulating the data stream into a form suitable for transmission over a transmission channel 110 via multiple transmit antennas K.

Receiver system 124 includes a demodulator 114 for demodulating the modulated signal received via multiple receive antennas N, and a log-map decoder 120 for providing soft symbol decision values in accordance with an exemplary embodiment of the this invention. Receiver system 124 further includes a de-interleaver 121 for inverting the interleaving introduced at the transmitter, and a Viterbi decoder 116 for decoding the soft decision symbol values into output data 130, as shown. Although not shown, communication system 100 comprises other components such as a scrambler and FFT/IFFT processing blocks. Discussion of such components is omitted as not being critical to understanding this invention.

Communication system 100 is preferably an OFDM (orthogonal frequency division multiplexing) system. By using OFDM, signals are split into several narrowband channels at different frequencies and processed to minimize interference between the channels. Preferably, OFDM is combined with a MIMO system having K transmit antennas and N receive antennas, where K and N can be greater than one. As noted, data rate and receiver sensitivity are increased by using MIMO systems. In addition, communication system 100 is operable in various modes, one of which is compliant with the IEEE 802.11a standard entitled "Part 11: Wireless LAN Medium Access Control (MAC) and Physical Layer (PHY) specifications, High-speed Physical Layer in the 5 GHz Band."

As shown in FIG. 1, input data 102 is fed into FEC encoder 104, where the data stream is encoded. The purpose of encoding is to decrease the bit error rate of the transmitted signal by introducing some form of redundancy into the transmitted data stream. After input data 102 is encoded, the encoded data bits are fed into an interleaver 105. These bits are grouped by interleaver 105 into groups that can be directly mapped to symbols. After interleaving, the grouped bits are provided to constellation mapper (not shown) which maps the encoded bits into signaling constellation symbols. Bits can be mapped onto BPSK, QPSK, 16 QAM and 64 QAM tones, for example. Thereafter, the complex number symbols are modulated by modulator 106 for transmission via the K transmit antennas. Note that data bits are transmitted as K dimensional vectors containing K complex number elements. Each vector element is chosen from the M-ary constellation used. For example, if K=2, and 16 QAM is used, vector elements may be represented by 0001 and 1010. Further, one element is transmitted by the first antenna while the other is transmitted by the second antenna. Also, note that total bits transmitted per channel usage is given by K*k=8.

At receiver 124, the transmitted signal is received and the reverse of the transmitter process occurs. However, in accordance with this invention, soft symbol decoding is performed by log map decoder 120. This soft metric is then fed to Viterbi decoder 116. The soft metrics are for indicating the likelihood of each state of transmitted bits. That is, the probability that the transmitted bit is 0 or 1. This probability is derived by obtaining the squared error between the received signal and all possible candidate transmissions. Log map decoder 120 calculates the difference of minimum distances between the received symbol and all possible symbols that have been sent with a 0 or 1 for each bit location. A normalized version of this distance is the desired soft metric. One of ordinary skill in the art will realize that log map decoder 120 comprises logic circuitry implementable through software, hardware or a combination of both. For example, one or more software instructions may be provided for running the steps of this invention.

Note that in the MIMO system used in the present invention, there are at least 256 possible candidate transmissions in the present invention. That is, where K=2, and each element of the transmitted vector is modulated using 16 QAM for example, there are $16^2$=256 possible transmissions. This means that decoding computations are 16 times as complex relative to SISO systems. In general, there will be $M^K$ possible candidate transmissions, where M is the signaling constellation used. Also, the complexity of this way of soft value computation is $2^{BK}$, where B is the number of bits transmitted per symbol on each antenna.

Figure 2:
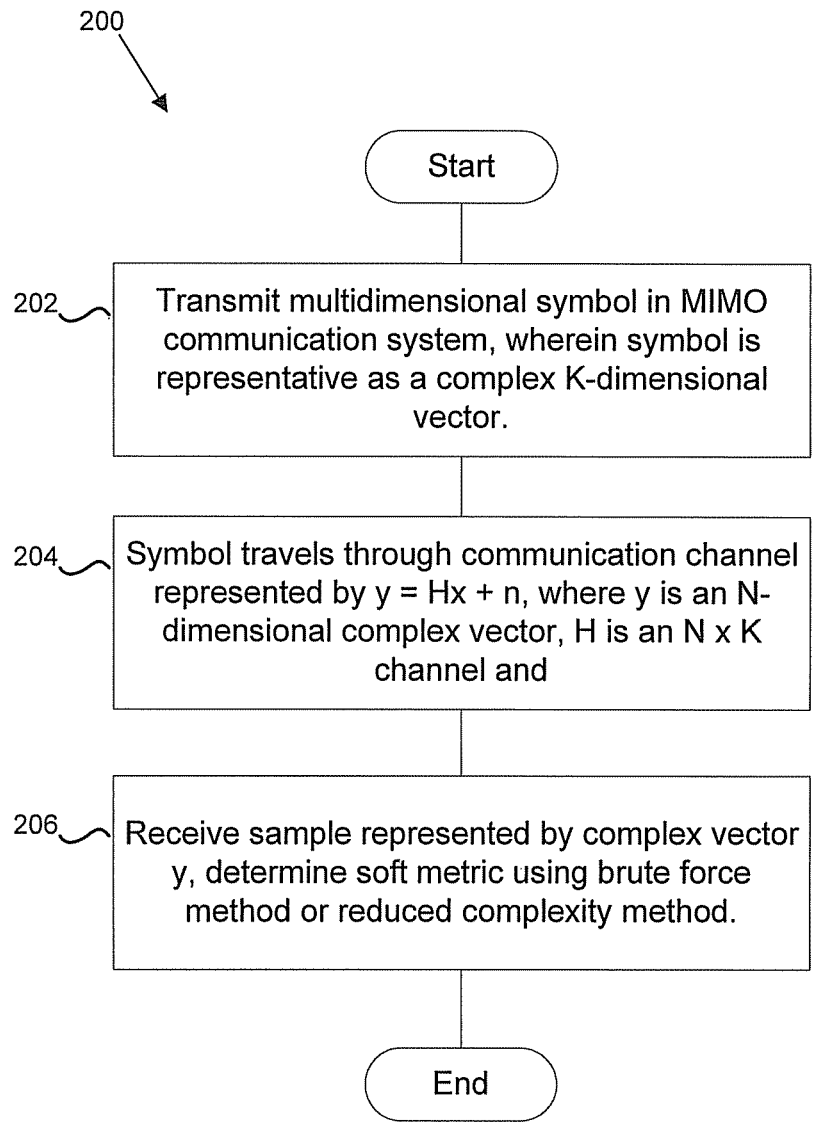
FIG. 2 is a method for providing soft symbol decoding of multi-dimensional symbols in accordance with one exemplary embodiment of the present invention.

FIG. 2 is a method 200 for providing soft symbol decoding in MIMO communication system 100 in accordance with one exemplary embodiment of the present invention.

Specifically, soft values for a received multi-dimensional symbol is provided by Log MAP decoder 120. These values are thereafter forwarded to FEC decoder 120a. As noted, K transmit antennas and N receive antennas are employed in MIMO communication system 100. One objective is to combine the increased data rate due to the use of multiple transmit antenna, and the increased receiver sensitivity (i.e. lower required signal to noise ratio) of obtained by using multiple receivers.

At block 302, a sample of a multi-dimensional symbol is transmitted by transmit antenna K. The multi-dimensional symbol is represent-able as a K-dimensional vector x containing K complex numbers $x_1 \ldots x_K$. Each complex number is chosen from an M-ary constellation, where M is the number of bits encoded. For example, in a 16-QAM constellation, each of the complex numbers is one of sixteen constellation points. Note that k=4 bits so that each complex number encodes 4 bits. Thus, each vector component of the vector x represents a signal transmitted with one of the K transmit antenna. In total K×k bits are transmitted.

At block 304, the signal is transmitted through transmission channel 110. This channel is represented by the equation:

$$y = Hx + n \quad (1)$$

where y is the symbol received by receiver 124, y being an N-dimensional complex vector, H is an N×K vector channel matrix consisting of K columns vectors $h_1 \ldots h_K$. Each of these vectors $h_k$ represents the channel coefficients modeling phase shift and amplitude change on the path between the K-th transmit antenna to the N receive antennas 1 ... N. In addition, n is a complex, N-dimensional vector representing the channel noise picked up at the N-th receive antenna. Each element n has the same expected power $E\{n_i^* n_i\} = E[|n_i|^2] = \sigma^2$.

At block 306, a sample represented by the complex vector y is received by receiver 124. Thereafter, log map decoder 120 applies soft decision decoding for each bit $b_i$ encoded by vector x according to the same equation:

$$L(b_i) = \sigma^{-2} \cdot \left( \min_{x_j | b_i = -1} \|y - Hx_j\|^2 - \min_{x_j | b_i = +1} \|y - Hx_j\|^2 \right) \quad (2)$$

where $x_j$ are all possible values for x. The receiver has to search over all possible x which are vectors. So if K=2 and each element of x is modulated using 16-QAM, for example, then x has $16^2$=256 possible values. In general the complexity of this way of soft value computation is $2^{BK}$, where B is the number of bits transmitted per symbol on each antenna, and K is the number of antennas.

It should be noted that for any N-dimensional complex vector v, the squared vector length is calculated as $$\|v\| = \sqrt{v^* \cdot v} = \sqrt{\sum_{i=1}^{N} v_i^* \cdot v_i} \quad (3)$$

Thus, in terms of real and imaginary components the complex elements of v:

$$v_i^* \cdot v_i = |v_i|^2 = Re(v_i)^2 + Im(v_i)^2 \quad (4)$$

This vector length can be approximated (with minimal soft value accuracy degradation) as $$\|v\| \approx \sum_{i=1}^{N} |Re(v_i)| + |Im(v_i)| \quad (5)$$

Reduced Complexity MIMO Reception

This exemplary embodiment is a method that reduces the complexity of the above computations from $2^{BK}$ to $2^{B(K-1)}$. For small values of K, i.e. 2 or 3 transmit antennas the reduction in complexity is considerable, especially if B is large. For instance for 64 QAM and K=2, a 64-fold reduction is obtained.

When y is received symbol, and $H = [h_1 \ldots h_K]$ is the channel matrix, first a scalar number z is computed as follows.

$$z = \frac{h_1^* y}{h_1^* h_1} = \frac{h_1^* y}{\|h_1\|^2} \quad (6)$$

Note that z is obtained by dividing two scalars. Here $h_1^*$ is the complex conjugate transpose of the first column of channel matrix H. Thereafter, the receiver starts a loop for all values of $x_2, \ldots X_K$. Therefore this loop is executed $2^{B(K-1)}$ times.

Loop:

An estimate of $x_1$, the first element of the transmitted vector x is formed as follows, by correcting x $$\hat{x}_1 = z - \frac{h_1^* h_2 x_2 - \ldots - h_1^* h_k x_k}{h_1^* h_1} \quad (7)$$

A simple QAM slicer is now applied to $\hat{x}_1$ to make hard decisions on the values of the bits of symbol $x_1$. Then the hard-decided $x_1$, and the $x_2 \ldots x_N$ loop variables are substituted in the equation below:

$$\|y - Hx_j\|^2 \quad (8)$$

End Loop

The $2^{B(K-1)}$ values obtained are used to determine the minima in the equation below $$L(b_i) = \sigma^{-2} \cdot \left( \min_{x_j|b_i=-1} \|y - Hx_j\|^2 - \min_{x_j|b_i=+1} \|y - Hx_j\|^2 \right) \quad (9)$$

and obtain the $L(b_i)$ values for all bits in symbols $x_2 \ldots x_K$. The entire procedure above is now redone, except that:

$$z = \frac{h_K^* y}{h_K^* h_K} = \frac{h_K^* y}{\|h_K\|^2} \quad (10)$$

This yields soft values for all bits in symbols $x_1 \ldots x_{K-1}$. The soft values for $x_2 \ldots x_{K-1}$ can now be thrown away since they have already been obtained in the first step. Those for $x_1$ will be retained and added to the values for $x_2 \ldots x_K$ obtained before.

While the above is a complete description of exemplary specific embodiments of the invention, additional embodiments are also possible. For example, a simplified variation of the reduced complexity algorithm is possible that only does the search loop once, possibly with performance costs. In contrast, the above technique does the loop twice to come up with the soft values for the first antenna. Rather than making only hard decisions on the values of the bits of symbol $x_1$, a conventional QAM soft decision is made on $$\hat{x}_1 = z - \frac{h_1^* h_2 x_2 - \ldots - h_1^* h_K x_K}{h_1^* h_1}$$

to obtain a soft metric values. Another augmentation to determining $L(b_i)$ would include determining soft metrics with the added assumption that the noise variance is not spatially white and is correlated. That is, the noise variance varies across receive antennas. The soft-metric computation would then be modified to be $$L(b_i) = \left( \min_{x_j|b_i=-1} \|(y - Hx_j)R^{-1}(y - Hx_j)^*\|^2 - \min_{x_j|b_i=+1} \|(y - Hx_j)R^{-1}(y - Hx_j)^*\|^2 \right) \quad (11)$$

where $R-1$ is the inverse of the spatial noise/interference auto-covariance matrix. In the case that the noise is independent across antennas (but not necessarily equal), this inverse matrix can be described for the N=3 case as:

$$R^{-1} = \begin{bmatrix} 1/\sigma_1^2 & 0 & 0 \\ 0 & 1/\sigma_2^2 & 0 \\ 0 & 0 & 1/\sigma_3^2 \end{bmatrix}$$

where $\sigma_i^2$ is the noise/interference power at antenna input i. Thus, the above description should not be taken as limiting the scope of the invention, which is defined by the appended claims along with their full scope of equivalents.

Appendix

Pseudo-code for both exhaustive search and reduced complexity algorithms are included below.

```
// variable declaration and initialization
#define B 6 // number of bits per antenna per symbol
#define M 2 // number of transmit antennas
double min [2] [M] [B];     // stores minima
double L [M] [B];           // log likelihood ratios
for (m=1 .. M)
    for (b=1 .. B)
        for (v=0, 1)
            min [v] [v] [m] = ∞;
// pseudo code for log-MAP decoder
for (bits[1] = 0 .. 2^B-1, bits[2]=0 .. 2^B-1, ..., bits[M]=0 .. 2^B-1) {
    dist = || r - H[1] *map(bits[1]) - ... - H[M] *map(bits[M]) ||^2;
    // note: map ( ) maps bits to constellations
    for (m = 1 .. M),
        for (b = 0 .. B-1)
            if (min [bits [m] & (1<<b)] [m] [b] > dist)
                min [bits [m] & (1<<b)] [m] [b] = dist;
}
for(m= 1 .. M)
    for (b = 0 .. B-1)
        L [m] [b] = min [0] [m] [b] – min [1] [m] (b];
// pseudo code for Reduced complexity log-MAP decoder
z = H[1]' *r;        // max ratio combining of x1
for (bits[2] = 0 .. 2^B-1) {
    // note: bits[1] excluded from loop!
    bits[1] = slice (z – H[1]' *H[2] *map(bits[2]))
    dist = || r - H[1] *map(bits[1]) ||^2;
    this is an additional simplification, it is not essential for the technique
    for(m= 1 .. M)
        for (b = 0 .. B-1)
            if(min [bits [m] & (1 <<b)] [m] [b] > dist)
                min [bits [m] & (1 <<b)] [m] [b] = dist;
}
z = H[2]' *r;        //max ratio combining of x2
for(bits[1]=0 .. 2^B-1) {
    // note: bits[1] excluded from loop!
    bits[2] = slice(z – H[2]' *H[1] *map(bits[1]))
    dist = || r - H[2] *map(bits[2]) ||^2;
    for(m= 1 .. M)
        for(b = 0 .. B-1)
            if (min [bits [m] & (1<<b)] [m] [b] > dist)
                min [bits [m] & (1<<b)] [m] [b] = dist;
}
for(m= 1 .. M)
    for(b = 0 .. B-1)
        L[m] [b] = min[0] [m] [b] – min[1] [m] [b];
```

What is claimed is:
1. A communications apparatus, comprising:
   an input configured to receive a digital signal that represents a symbol transmitted over a transmit antenna;
   a first decoder configured to perform a computation of a set of soft metrics of the transmitted symbol, wherein the computation has a complexity of $2^{B(K-1)}$ where B is a number of bits transmitted per symbol on an antenna, and K is a number of transmit antennas, the set of soft metrics to indicate a likelihood of a state of bits of the symbol, at least in part by computing an estimate of a first element of the transmitted symbol, based on the estimate, making a hard decision on values of bits of the first element to form a hard-decided first element, computing soft metrics for second to $K^{th}$ elements of the transmitted symbol at least partly in terms of the hard-decided first element, computing a soft metric for at least the first element of the transmitted symbol, and obtaining the soft metrics of the transmitted symbol in terms of the soft metric for the first element of the transmitted symbol and the soft metrics for the second to $K^{th}$ elements; and a second decoder configured to utilize the set of soft metrics to determine a symbol value corresponding to the transmitted symbol.

2. The communications apparatus of claim 1, wherein the symbol is multi-dimensional and represented as a dimensional vector comprising complex numbers.

3. The communications apparatus of claim 2, wherein a size of the dimensional vector is based on a number of transmit antennas employed to transmit the digital signal.

4. The communications apparatus of claim 2, wherein the complex numbers are selected from an M-ary constellation, where M is a number of bits encoded.

5. A method for facilitating wireless communication, comprising:

receiving a symbol represented as a complex vector;

applying a soft decision decoding for the symbol, wherein the soft decision decoding includes computing an estimate of a first element of the symbol, based on the estimate, making a hard decision on values of bits of the first element to form a hard-decided first element, computing soft metrics for second to $K^{th}$ elements of the symbol at least partly in terms of the hard-decided first element, where K is a number of transmit antennas corresponding to the symbol, computing a soft metric for at least the first element of the symbol, and obtaining soft metrics of the symbol in terms of the soft metric for the first element of the symbol and the soft metrics for the second to $K^{th}$ elements; and utilizing the soft metrics of the symbol to determine a symbol value.

6. The method of claim 5, further comprising ascertaining a likelihood of a state associated with at least one bit encoded by the complex vector, wherein the state is 0 or 1.

7. The method of claim 6, wherein the ascertaining further comprising obtaining a squared error between a signal that includes the symbol and possible candidate signals.

8. A computer program product for a wireless communication network, comprising:

a computer-readable non-transitory medium comprising:

code for receiving at least one symbol represented as a complex vector;

code for applying soft decision decoding for the complex vector, the soft decision decoding including computing an estimate of a first element of the at least one symbol, based on the estimate, making a hard decision on values of bits of the first element to form a hard-decided first element, computing soft metrics for second to $K^{th}$ elements of the at least one symbol at least partly in terms of the hard-decided first element, where K is a number of transmit antennas corresponding to the at least one symbol, computing a soft metric for at least the first element of the at least one symbol, and obtaining soft metrics of the at least one symbol in terms of the soft metric for the first element of the at least one symbol and the soft metrics for the second to $K^{th}$ elements; and code for employing the soft metrics to determine at least one symbol value of the at least one symbol.

9. The computer program product of claim 8, the computer-readable non-transitory medium further comprising code for determining likelihood states associated with bits encoded by the complex vector, wherein the likelihood states are 0 or 1.

10. The computer program product of claim 9, the computer-readable non-transitory medium further comprising code for obtaining a squared error between signals including the at least one symbol.

11. Communications means, comprising:

input means for receiving a digital signal that represents a symbol transmitted over a transmit antenna;

first decoder means for performing a computation of a set of soft metrics of the transmitted symbol, wherein the computation has a complexity of $2^{B(K-1)}$, where B is a number of bits transmitted per symbol on an antenna, and K is a number of transmit antennas, the set of soft metrics to indicate a likelihood of a state of bits of the symbol, the first decoder means including estimating means for computing an estimate of a first element of the transmitted symbol, decision means for making a hard decision on values of bits of the first element to form a hard-decided first element, and metrics computing means for computing soft metrics for second to $K^{th}$ elements of the transmitted symbol at least partly in terms of the hard-decided first element, computing a soft metric for at least the first element of the transmitted symbol, and obtaining the soft metrics of the transmitted symbol in terms of the soft metric for the first element of the transmitted symbol and the soft metrics for the second to $K^{th}$ elements; and second decoder means for utilizing the set of soft metrics to determine a symbol value corresponding to the transmitted symbol.

* * * * *